US006790058B2

United States Patent
Schlieber

(10) Patent No.: US 6,790,058 B2
(45) Date of Patent: Sep. 14, 2004

(54) DEVICE FOR FIXING SWITCHGEARS ON MOUNTING RAILS

(75) Inventor: Simone Schlieber, Burgbrohl (DE)

(73) Assignee: Moeller GmbH, Bonn (DE)

(*) Notice: Subject to any disclaimer, the term of this patent is extended or adjusted under 35 U.S.C. 154(b) by 0 days.

(21) Appl. No.: 10/203,591

(22) PCT Filed: Dec. 6, 2000

(86) PCT No.: PCT/EP00/12270
§ 371 (c)(1),
(2), (4) Date: Aug. 9, 2002

(87) PCT Pub. No.: WO01/59898
PCT Pub. Date: Aug. 16, 2001

(65) Prior Publication Data
US 2003/0013351 A1 Jan. 16, 2003

(30) Foreign Application Priority Data
Feb. 10, 2000 (DE) .......... 100 05 818

(51) Int. Cl.[7] ............................. H01R 25/00
(52) U.S. Cl. .................. 439/110; 439/716; 439/532
(58) Field of Search .............. 439/110, 532, 439/121, 716, 94

(56) References Cited

U.S. PATENT DOCUMENTS

| 5,249,979 | A | * | 10/1993 | Deinhardt et al. .......... 439/341 |
|---|---|---|---|---|
| 5,316,164 | A | * | 5/1994 | Feuerlein et al. .......... 220/3.2 |
| 5,810,618 | A | * | 9/1998 | Barbier et al. ............. 439/532 |
| 5,863,219 | A | * | 1/1999 | Rischard .................. 439/532 |
| 6,164,988 | A | | 12/2000 | Wagener ................... 439/110 |
| 6,354,888 | B1 | * | 3/2002 | Cech et al. ................ 439/716 |
| 6,411,500 | B1 | * | 6/2002 | Kaaden et al. ............. 361/614 |
| 6,452,785 | B1 | * | 9/2002 | Kaaden et al. ............. 361/622 |
| 6,543,957 | B1 | * | 4/2003 | Raspotnig .................. 403/286 |

FOREIGN PATENT DOCUMENTS

| DE | 7318411 | 9/1973 |
|---|---|---|
| DE | 19515922 | 8/1996 |
| DE | 19515923 | 11/1996 |
| DE | 29617112 | 12/1996 |
| DE | 19715220 | 10/1998 |
| DE | 19755841 | 12/1998 |
| DE | 19744827 | 4/1999 |

* cited by examiner

Primary Examiner—Tho D. Ta
Assistant Examiner—X. Chung-Trans
(74) Attorney, Agent, or Firm—Davidson, Davidson & Kappel, LLC

(57) ABSTRACT

The invention relates to a device for fixing switchgears (2,4) on mounting rails, especially top hat rail adapters, comprising lower fixing means (8) which are used to secure the device on the mounting rail and upper fixing means (10a, 10b) which are used to secure at least one switchgear (2,4) on the device. According to the invention, at least one of the active elements (8b; 10b) is mounted in such a way that it can move in a linear manner on the fixing axis (X).

20 Claims, 3 Drawing Sheets

DEVICE FOR FIXING SWITCHGEARS ON MOUNTING RAILS

BACKGROUND

The present invention relates to a device for fixing switching devices to mounting rails.

A mounting plate for attachment of a switching device combination including a contactor and a circuit-breaker is already known from German Publication DE 296 17 112 U1. This mounting plate features, on its back side, a top-hat rail fixing device for fixing the mounting plate to the top-hat rail and, on its front side, a top-hat rail for fixing a switching device to the mounting plate. The mounting further has two rows of holes which run parallel and are used for optional attachment of a further top-hat rail to the mounting plate.

SUMMARY OF THE INVENTION

The object of the present invention is to provide a device of this type, which makes easier to fix a device combination to a mounting rail, while providing high fastening security of the device combination on the mounting rail.

The present invention provides a fixing apparatus for fixing a switching apparatus to a mounting rail. The fixing apparatus includes a lower-side fixing device configured to fix the fixing apparatus to the mounting rail and including a first and a second active element which oppose each other; and an upper-side fixing device configured to fix the switching apparatus to the fixing apparatus and including a third and a fourth active element which oppose each other. At least one of the first, second, third, and fourth active elements is supported in a linearly movable manner such that the distance to the opposite active element is variable so as to provide a plurality of fixing positions.

The device according to the present invention is preferably designed as an adapter for top-hat rail profiles and provided, on its back side, with first means for attachment to a mounting rail and, on its front side, with second means for attachment or of a switching device or a switching device combination. The means for fixing a switching device or a switching device combination are preferably designed as L-shaped profile appendages, as they are known as the unilateral undergrip portion of a top-hat rail profile. The adapter is essentially constituted by an elongated, cuboidal base plate which, on its front side, is provided at one end with a fixedly arranged first active element for engagement with a mounting recess of a first switching device of the switching device combination and which, at a distance from this first active element, preferably at its other end, features a second active element, which is supported on the base plate in such a manner that it is linearly movable in its mounting axis X. In this context, the first active element is preferably formed in one piece with the base plate, which is composed of insulating material, while the second active element is preferably formed in one piece with a holding element, which is composed of insulating material and is arranged on the base plate in such a manner that it is linearly movable. In a preferred embodiment, the linearly movable active element is formed as a block-like or as a cap-like part of the base plate which is movable on the base plate and embraces the base plate in regions thereof, the block-like or cap-like part being biased outwardly by spring means in a direction away from the fixed active element.

In this context, the holding element is provided, on its upper side, with an L-shaped fixing profile for engagement with the opening of a mounting recess of a switching device.

BRIEF DESCRIPTION OF THE DRAWINGS

Further details and advantages of the present invention will be explained below based on exemplary embodiments with reference to the drawings.

DETAILED DESCRIPTION

Figure 1:
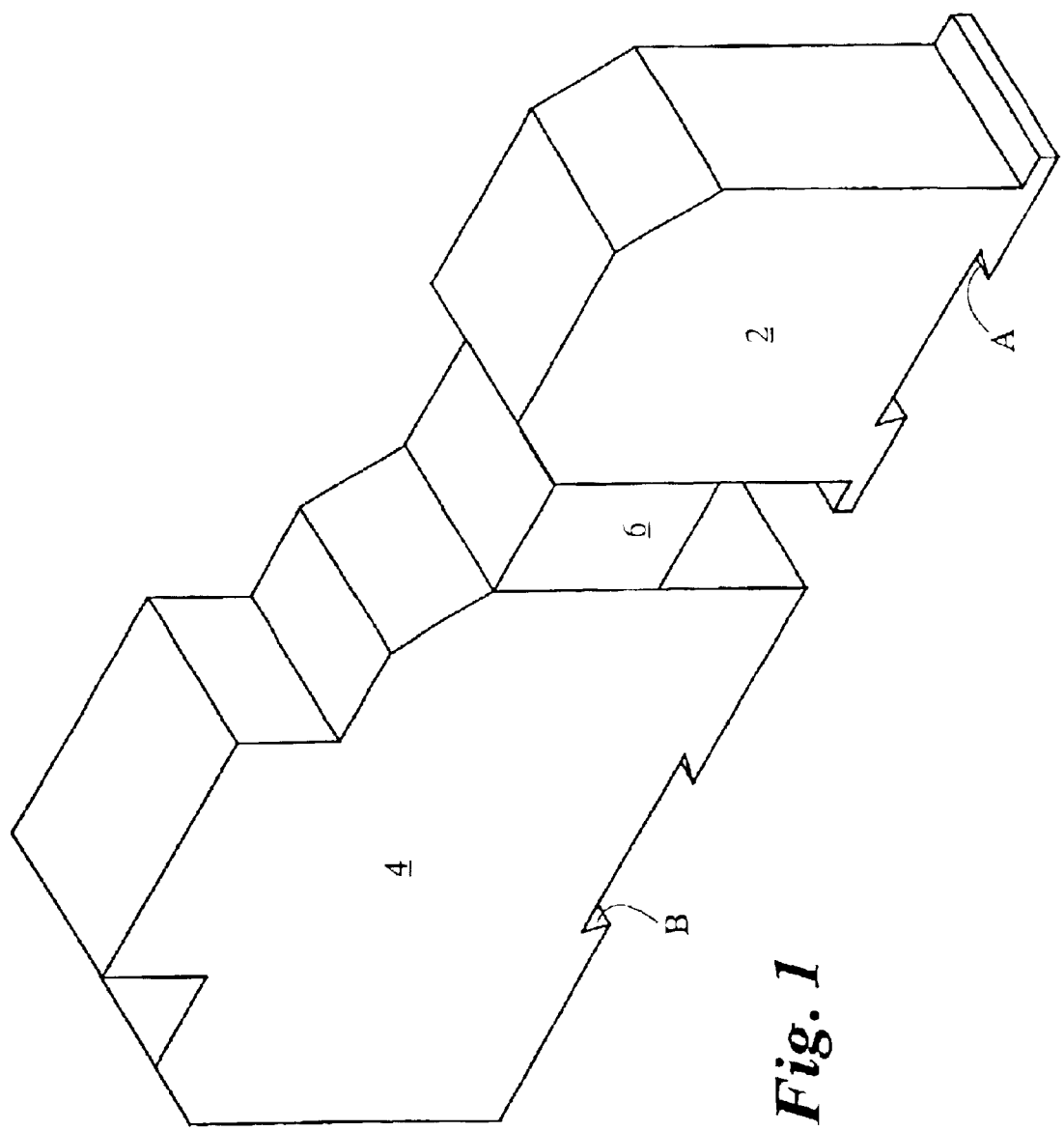
FIG. 1 shows a switching device combination (for example, a motor starter combination)

According to FIG. 1, a possible switching device combination to be secured to a mounting rail having a top-hat rail profile or the like is composed of a contactor 2 and a motor protection switch 4. In the embodiment shown, the two separate devices are interconnected and wired up by a preferably rigid connecting piece 6 (wiring adapter). Once the switching device combination is mounted to the fixing device, the connection area of the two switching devices is protected in a stabilizing manner by the upper side of the fixing device. In this manner, connecting piece 6 is freed from mechanical stress.

Figure 2:
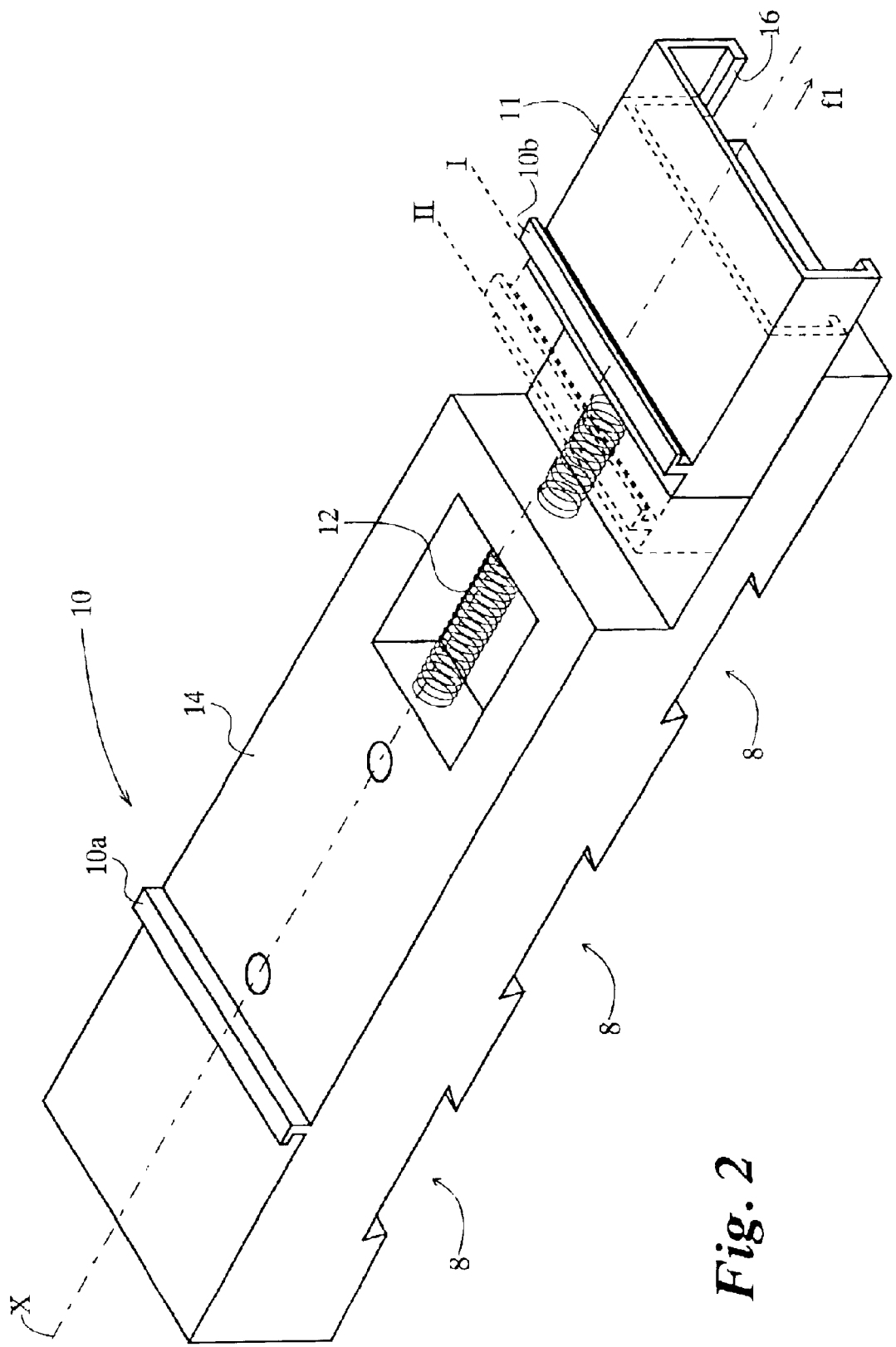
FIG. 2 depicts a possible embodiment of the device according to the present invention for fixing a switching device combination.
Figure 3:
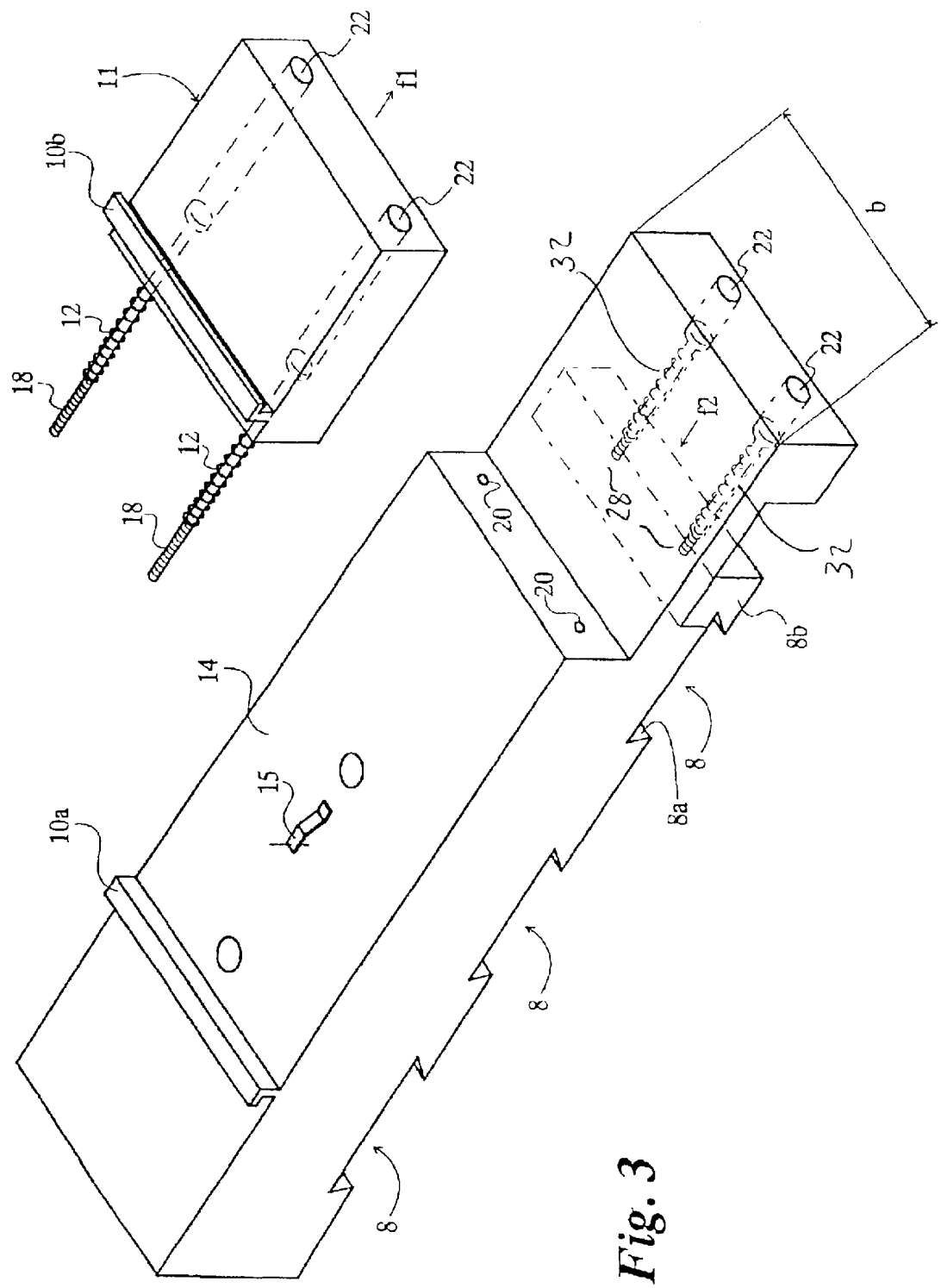
FIG. 3 shows a further possible embodiment of the device according to the present invention for fixing a switching device combination.

FIGS. 2 and 3 each show a possible embodiment of the device according to the present invention. This device is preferably designed as a top-hat rail adapter and provided, on its side facing the mounting rail (lower side), with first fixing means 8 for fixing the device to a mounting rail. On its side facing away from the mounting rail (upper side), the device features second fixing means 10 for attachment of a switching device, in particular, of a switching device combination 2, 4, 6 according to FIG. 1. Each of fixing means 8; 10 includes active elements 8a, 8b; 10a, 10b which oppose each other in pairs.

According to the present invention, at least one of active elements 8b; 10b is supported in such a manner that it is linearly movable along mounting axis X. In this context, the respective active element 8b; 10b is designed and supported on base plate 14 of the device in such a manner that it can be transported from a first fixing position I to a second fixing position II which is axially spaced from first fixing position I. It is preferred for active element 8b; 10b to extend over the whole width b of base plate 14, as shown in FIGS. 2 and 3.

This method of mounting upper-side active elements 10a, 10b is preferably accomplished in that movable active element 10b is biased outwardly by a spring means 12 along its axis of motion away from the center point of the device. This, first of all, makes it easier to mount switching device combinations according to FIG. 1 and it is only through this that the mounting of preassembled switching device combinations becomes possible. Secondly, dimensional tolerances of the fixing means of the fixing device and dimensional tolerances of the switching devices are compensated for. A further advantage is achieved if movable active element 10b is arranged so close to the end of base plate 14 of the device that it projects over base plate 14 of the device in the direction of mounting axis X so that, when the device combination is installed, the fixing device is always only as long as is actually required (the adapter is pushed together). This saves valuable space in the mounting space (for example, a switchgear cabinet). Because of the achieved compensation of tolerances, moreover, the noise which is produced by the mounted switching device combination due to the switching operations is reduced in that a lateral displacement of the combination on the top-hat rail or on the fixing device is minimized through the spring-loaded fixing means. The fixation of switching devices 2, 4 is advantageously further assisted by the device having spring means 15 on the upper side which exert a spring force against at least one of the switching devices when the switching device combination is in the installed position. A spring means 15 of that kind can be designed, for example, in the form of a flexible leg which is injected on base plate 14 and presses against one or each of switching devices 2, 4 from below. In another embodiment, an elastic spring element can be designed in the form of a spiral spring or of an elastic foamed plastic part or the like.

The mounting of a preassembled device combination on the adapter according to the present invention is carried out as follows:

Starting from a fixing device according to the present invention which is mounted on horizontally running mounting rails, a switching device combination is to be mounted to the fixing device in that the device combination grips behind linearly movable active element 10b with the lower recess A of first switching device 2, active element 10b is moved against spring force f1, and second switching device 4 is hung on stationary active element 10a with its upper recess B.

According to FIGS. 2 and 3, upper-side active elements 10a, 10b are preferably designed as L-shaped profile appendages, providing a similar shape to known unilateral undergrip portions of a top-hat rail profile. The fixing device includes an elongated, cuboidal base plate 14 which, on its front side, is provided at one end with at least one fixedly arranged first fixing appendage (active element 10a) for engagement with a mounting recess of a switching device and which, at a distance from this first appendage, preferably at its other end, features a second fixing appendage (active element 10b), which is supported on base plate 14 in such a manner that it is linearly movable along mounting axis X. In this context, first active element 10a is preferably formed in one piece with base plate 14, which is composed of insulating material, while second active element 10b is preferably formed in one piece with a holding element 11, which is arranged on base plate 14 in such a manner that it is linearly movable. To be able to mount different switching device combinations of markedly different size and consequently also of markedly different length, provision can be made for several active elements 10a in order to permit adjustment to greater distances of mounting recesses A, B of the switching devices of a combination. As an alternative to this, it is also possible to provide a single active element 10a which can be locked in different positions on base plate 14, for example, by means of spaced apart latch positions.

In a preferred embodiment, linearly movable holding element 11 is formed as block-like or as a cap-like or part of base plate 14 which is movable on base plate 14 and embraces base plate 14 in regions thereof, the block-like or cap-like part being biased outwardly by spring means 12 in a direction away from fixed active element 10a.

According to FIG. 2, holding element 11 is designed as a cap-like element. In this context, when viewed in cross-section, holding element 11, has an essentially U-shaped design, featuring inwardly directed appendages 16 at its lateral leg parts embracing base plate 14. These appendages 16 engage with corresponding guide grooves of base plate 14. Spring element 12 is designed, for example, as a spiral spring and, in the exemplary embodiment shown, is located between base plate 14 and holding element 11 essentially axially.

In another embodiment of holding element 11 according to FIG. 3, the holding element is designed as a block-like element. In this context, holding element 11 can be connected to base plate 14, for example, via screws 18 instead of being guided via guide grooves as in FIG. 2. To this end, base plate 14 is provided with tapped holes 20 to accommodate screws 18. The screws are guided in blind holes 22 of holding element 11 and biased outwardly by a spring force f1 against base plate 14 via spring elements 12.

The present invention is not limited to the specific embodiments described above but includes also all equally acting embodiments along the lines of the present invention. In a further refinement of the present invention, analogously to holding element 11, which is supported in such a manner that is linearly movable and used for fixing a switching device combination 2, 4, 6 to the upper side of the device according to the present invention, at least one of lower-side active elements 8a, 8b is also designed to be linearly movable. To this end, active element 8b of the dovetailed recess (lower-side fixing means 8) is supported in such a manner that it is linearly movable along mounting axis X to accommodate a top-hat rail. In this context, active element 8b is also preferably connected to base plate 14 via two screws 28 and biased by spiral springs 32 located on screws 28 with a spring force f2 which is directed into the interior of the mounting fixture. Moreover, all features shown in the drawing belong to the present invention as well. In particular, the geometry as shown. Moreover, provision can be made for fixation means which are used to fix linearly movable active elements (8b; 10b) in position. These fixation means can be designed, in particular, as a locking screw for fixing the corresponding movable means in an installed position relative to base plate 14.

What is claimed is:

1. A fixing apparatus for fixing a switching apparatus to a mounting rail, comprising:
    a lower-side fixing device configured to fix the fixing apparatus to the mounting rail and including a first and a second active element which oppose each other; and
    an upper-side fixing device configured to fix the switching apparatus to the fixing apparatus and including a third and a fourth active element which oppose each other;
    wherein the fourth active element is supported in a linearly movable manner such that the distance to the third active element is variable so as to provide a plurality of fixing positions.

2. The fixing apparatus as recited in claim 1 wherein the fixing apparatus serves as a top-hat rail adapter.

3. The fixing apparatus as recited in claim 1 further comprising a base plate, the first and second active elements being disposed in a first plane extending parallel to a surface plane of the base plate, the third and fourth active elements being disposed in a second plane extending parallel to the surface plane.

4. The fixing apparatus as recited in claim 1 wherein the switching apparatus includes top-hat rail receptacles.

5. The fixing apparatus as recited in claim 1 further comprising a base plate, the at least one active element being supported in a linearly movable manner and extending over an entire width of the base plate.

6. The fixing apparatus as recited in claim 1 wherein the fourth active element is biased away from a center point of the fixing apparatus by a spring device along an axis of motion.

7. The fixing apparatus as recited in claim 1 wherein the fourth active element includes a holding cap having a U-shaped cross-section.

8. The fixing apparatus as recited in claim 7 further comprising a base plate, the holding cap including inwardly directed appendages configured to engage with lateral guide grooves of the base plate.

9. The fixing apparatus as recited in claim 1 wherein the second active element is supported in a linearly movable manner and is biased toward a center point of the fixing apparatus by a spring device along an axis of motion.

10. The fixing apparatus as recited in claim 1 wherein the fourth active element includes a fixation device for locking the at least one active element in a position.

11. The fixing apparatus as recited in claim 10 wherein the fixation device includes a locking screw.

12. The fixing apparatus as recited in claim 1 further comprising a spring device disposed at an upper side of the fixing apparatus, the spring device configured to exert a spring force against at least a portion of the switching apparatus when the switching apparatus is in an installed position.

13. The fixing apparatus as recited in claim 1 further comprising a fifth active element axially spaced from the fourth active element.

14. The fixing apparatus as recited in claim 1 further comprising a base plate, at least one of the active elements being capable of being locked in a plurality of axially spaced positions on the base plate.

15. A fixing apparatus for fixing a switching apparatus to a mounting rail, comprising:
   a lower-side fixing device configured to fix the fixing apparatus to the mounting rail and including a first and a second active element which oppose each other; and
   an upper-side fixing device configured to fix the switching apparatus to the fixing apparatus and including a third and a fourth active element which oppose each other;
   wherein the second active element is supported in a linearly movable manner such that the distance to the first active element is variable so as to provide a plurality of fixing positions.

16. The fixing apparatus as recited in claim 15 wherein the fixing apparatus serves as a top-hat rail adapter.

17. The fixing apparatus as recited in claim 15 wherein the second active element is biased away from a center point of the fixing apparatus by a spring device along an axis of motion.

18. The fixing apparatus as recited in claim 15 wherein the fourth active element is supported in a linearly movable manner and is biased toward a center point of the fixing apparatus by a spring device along an axis of motion.

19. A fixing apparatus for fixing a switching apparatus to a mounting rail, comprising:
   a lower-side fixing device configured to fix the fixing apparatus to the mounting rail and including a first and a second active element which oppose each other; and
   an upper-side fixing device configured to fix the switching apparatus to the fixing apparatus and including a third and a fourth active element which oppose each other;
   wherein the second active element is supported in a linearly movable manner such that the distance to the first active element is variable so as to provide a plurality of first fixing positions, and the fourth active element is supported in a linearly movable manner such that the distance to the third active element is variable so as to provide a plurality of second fixing positions.

20. The fixing apparatus as recited in claim 19 wherein the fixing apparatus serves as a top-hat rail adapter.

* * * * *